United States Patent
Kim et al.

(10) Patent No.: US 10,171,154 B2
(45) Date of Patent: Jan. 1, 2019

(54) METHOD FOR REPORTING BEAM INDEX FOR 3D MIMO TRANSMISSION IN WIRELESS COMMUNICATION SYSTEM, AND DEVICE THEREFOR

(71) Applicant: LG ELECTRONICS INC., Seoul (KR)

(72) Inventors: Hyungtae Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/759,372

(22) PCT Filed: Sep. 8, 2016

(86) PCT No.: PCT/KR2016/010085
§ 371 (c)(1),
(2) Date: Mar. 12, 2018

(87) PCT Pub. No.: WO2017/043883
PCT Pub. Date: Mar. 16, 2017

(65) Prior Publication Data
US 2018/0212666 A1    Jul. 26, 2018

Related U.S. Application Data

(60) Provisional application No. 62/217,024, filed on Sep. 11, 2015.

(51) Int. Cl.
*H04B 7/00* (2006.01)
*H04B 7/06* (2006.01)
(Continued)

(52) U.S. Cl.
CPC ............. *H04B 7/0639* (2013.01); *H04B 7/04* (2013.01); *H04B 7/0421* (2013.01); *H04B 7/06* (2013.01); *H04W 24/10* (2013.01)

(58) Field of Classification Search
CPC .... H04B 7/0639; H04B 7/0421; H04W 24/10
See application file for complete search history.

(56) References Cited

U.S. PATENT DOCUMENTS 9,838,095 B2 * 12/2017 Rahman ............... H04B 7/0482
2004/0213187 A1 * 10/2004 Fujii ..................... H04B 7/0408
370/335

(Continued)

FOREIGN PATENT DOCUMENTS

| KR | 10-2011-0013314 A | 2/2011 |
| KR | 10-2012-0031893 A | 4/2012 |

(Continued)

*Primary Examiner* — Jean B Corrielus
(74) *Attorney, Agent, or Firm* — Birch, Stewart, Kolasch & Birch, LLP

(57) ABSTRACT

Disclosed in the present application is a method by which a terminal reports a beam index to a base station in a wireless access system. The beam index reporting method comprises the steps of: receiving a plurality of reference signals from the base station; measuring a plurality of beams by using the plurality of reference signals; reporting an index of a first preferential beam among the plurality of beams to the base station; and reporting, to the base station, information on at least one second preferential beam determined on the basis of the first preferential beam, wherein the information on at least one second preferential beam is information on an index difference between the first preferential beam and the at least one second preferential beam.

12 Claims, 9 Drawing Sheets

(51) Int. Cl.
*H04B 7/04* (2017.01)
*H04B 7/0417* (2017.01)
*H04W 24/10* (2009.01)

(56) References Cited

U.S. PATENT DOCUMENTS

2015/0244438 A1 8/2015 Ding et al.
2018/0132252 A1* 5/2018 Islam .................. H04W 72/085

FOREIGN PATENT DOCUMENTS

KR 10-2013-0025102 A 3/2013
WO WO 2014/117352 A1 8/2014

* cited by examiner

FIG. 5
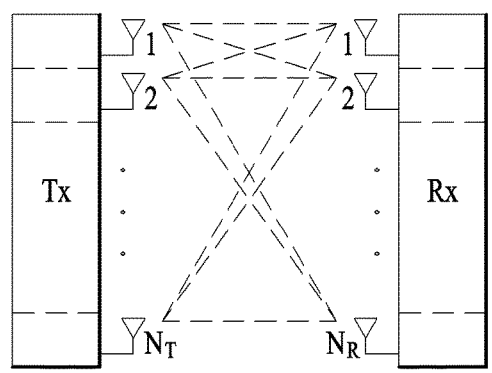
(a)
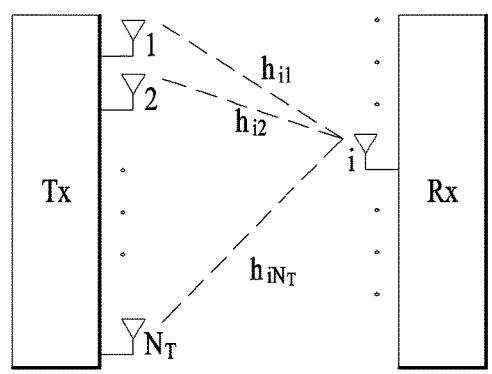
(b)

METHOD FOR REPORTING BEAM INDEX FOR 3D MIMO TRANSMISSION IN WIRELESS COMMUNICATION SYSTEM, AND DEVICE THEREFOR

CROSS REFERENCE TO RELATED APPLICATIONS

This application is the National Phase of PCT International Application No. PCT/KR2016/010085, filed on Sep. 8, 2016, which claims priority under 35 U.S.C. 119(e) to U.S. Provisional Application No. 62/217,024, filed on Sep. 11, 2015, all of which are hereby expressly incorporated by reference into the present application.

TECHNICAL FIELD

The present invention relates to wireless communication system, and more particularly, to a method of reporting a beam index for 3D MIMO transmission in a wireless communication system and an apparatus therefor.

BACKGROUND ART

MIMO (multi-input multi-output) technology corresponds to a technology for increasing data transmission and reception efficiency using a plurality of transmission antennas and a plurality of reception antennas instead of using a single transmission antenna and a single reception antenna. If a single antenna is used, a receiving end receives data through a single antenna path. On the contrary, if multiple antennas are used, the receiving end receives data through several paths, thereby enhancing transmission speed and transmission capacity and increasing coverage.

A single-cell MIMO operation can be divided into a single user-MIMO (SU-MIMO) scheme that a single user equipment (UE) receives a downlink signal in a single cell and a multi user-MIMO (MU-MIMO) scheme that two or more UEs receive a downlink signal in a single cell.

Channel estimation corresponds to a procedure of restoring a received signal by compensating a distortion of the signal distorted by fading. In this case, the fading corresponds to a phenomenon of rapidly changing strength of a signal due to multi-path time delay in wireless communication system environment. In order to perform the channel estimation, it is necessary to have a reference signal known to both a transmitter and a receiver. The reference signal can be simply referred to as an RS (reference signal) or a pilot depending on a standard applied thereto.

A downlink reference signal corresponds to a pilot signal for coherently demodulating PDSCH (physical downlink shared channel), PCFICH (physical control format indicator channel), PHICH (physical hybrid indicator channel), PDCCH (physical downlink control channel) and the like. A downlink reference signal can be classified into a common reference signal (CRS) shared by all UEs within a cell and a dedicated reference signal (DRS) used for a specific UE only. Compared to a legacy communication system supporting 4 transmission antennas (e.g., a system according to LTE release 8 or 9 standard), a system including an extended antenna configuration (e.g., a system according to LTE-A standard supporting 8 transmission antennas) is considering DRS-based data demodulation to efficiently manage a reference signal and support an enhanced transmission scheme. In particular, in order to support data transmission through an extended antenna, it may be able to define a DRS for two or more layers. Since a DRS and data are precoded by a same precoder, it is able to easily estimate channel information, which is used for a receiving end to demodulate data, without separate precoding information.

Although a downlink receiving end is able to obtain precoded channel information on an extended antenna configuration through a DRS, it is required for the downlink receiving end to have a separate reference signal except the DRS to obtain channel information which is not precoded. Hence, it is able to define a reference signal for obtaining channel state information (CSI), i.e., a CSI-RS, at a receiving end in a system according to LTE-A standard.

DISCLOSURE OF THE INVENTION

Technical Task

Based on the aforementioned discussion, a method of reporting a beam index for 3D MIMO transmission in a wireless communication system and an apparatus therefor are proposed in the following.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting a beam index, which is reported by a user equipment (UE) to an eNB in a wireless access system, includes the steps of receiving a plurality of reference signals from the eNB, measuring a plurality of beams using a plurality of the reference signals, reporting an index of a most preferred beam among a plurality of the beams to the eNB, and reporting information on at least one second preferred beam, which is determined on the basis of the most preferred beam, to the eNB. In this case, the information on the at least one second preferred beam may correspond to information on an index difference between the most preferred beam and the at least one second preferred beam.

To further achieve these and other advantages and in accordance with the purpose of the present invention, according to a different embodiment, a method of receiving a beam index, which is received by an eNB from a user equipment (UE) in a wireless access system, includes the steps of transmitting a plurality of reference signal to the UE, receiving an index of a most preferred beam among a plurality of beams, which are measured using a plurality of the reference signals, from the UE, and receiving information on at least one second preferred beam, which is determined on the basis of the most preferred beam, from the UE. In this case, the information on the at least one second preferred beam may correspond to information on an index difference between the most preferred beam and the at least one second preferred beam.

Preferably, the most preferred beam may correspond to a beam for performing wideband DL transmission and the at least one second preferred beam may correspond to a beam for performing subband DL transmission. Or, preferably, a reporting interval of the most preferred beam can be configured by a multiple of a reporting interval of the at least one second preferred beam.

More preferably, the information on the at least one second preferred beam may include information on whether or not the at least one second preferred beam is identical to the most preferred beam.

The eNB can provide configuration information of a plurality of the reference signals to the UE. In this case, the index of the most preferred beam corresponds to an index of a reference signal corresponding to the most preferred beam.

Preferably, a difference between an index of the at least one second preferred beam and the index of the most preferred beam is equal to or less than 2.

Advantageous Effects

According to embodiments of the present invention, a UE can efficiently report a CSI, i.e., a beam index, in a wireless communication system, i.e., a wireless communication system to which 3D MIMO is applied.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system including a plurality of antennas;

BEST MODE

Mode for Invention

Figure 1:
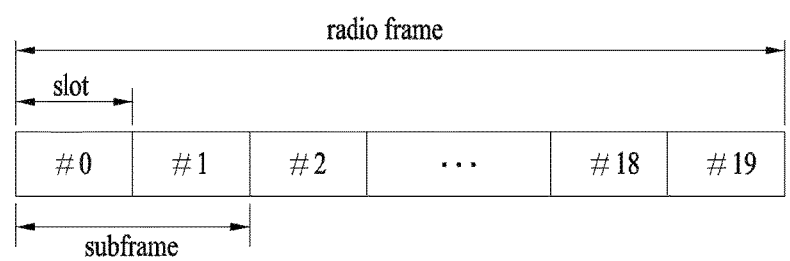
FIG. 1 is a diagram for a structure of a downlink radio frame.

The embodiments described in the following correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a user equipment and an eNode B. In this case, the eNode B may correspond to a terminal node of a network directly performing communication with the user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like. A terminal may be substituted with such a terminology as a relay node (RN), a relay station (RS), and the like. And, a terminal may be substituted with such a terminology as a user equipment (UE), a mobile station (MS), a mobile subscriber station (MSS), and the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a downlink radio frame is explained in the following with reference to FIG. 1.

Referring to FIG. 1, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1 is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol period. The OFDM symbol may be referred to as SC-FDMA symbol or symbol period. The resource block (RB) as a resource allocation unit may include a plurality of continuous subcarriers in one slot.

The number of OFDM symbols included in one slot may vary depending on a configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

The aforementioned structure of a radio frame is just an example only. The number of subframes included in a radio frame, the number of slots included in a subframe and the number of symbols included in a slot may be modified in various ways.

Figure 2:
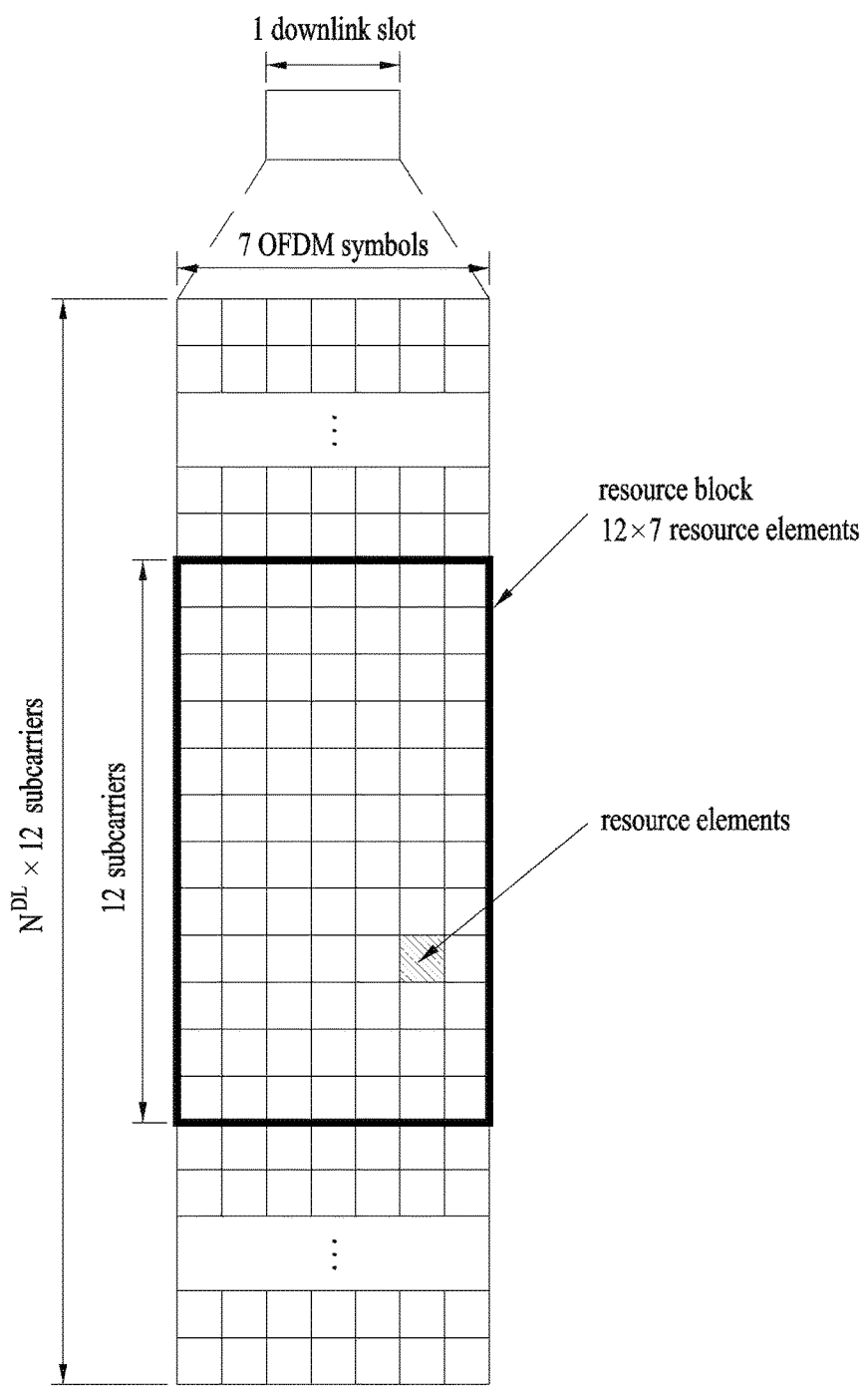
FIG. 2 is a diagram for an example of a resource grid of a downlink slot.

FIG. 2 is a diagram for an example of a resource grid of a downlink slot. FIG. 2 shows a case that an OFDM symbol is configured by a normal CP. Referring to FIG. 2, a downlink slot includes a plurality of OFDM symbols in a time domain and a plurality of resource blocks in a frequency domain. In this case, although FIG. 2 illustrates that a downlink slot includes seven OFDM symbols and a resource block includes twelve subcarriers, by which the present invention may be non-limited. Each element on the resource grid will be referred to as a resource element (RE). For example, an RE a (k, 1) may correspond to an RE positioned at a kth subcarrier and an lth OFDM symbol. In case of a normal CP, one resource block includes 12*7 resource elements (in case of an extended CP, one resource block includes 12*6 resource elements). Since a space between subcarriers corresponds to 15 kHz, one resource block includes about 180 kHz in frequency domain. NDL corresponds to the number of resource blocks included in a downlink slot. A value of the NDL can be determined according to a downlink transmission bandwidth scheduled by a base station.

Figure 3:
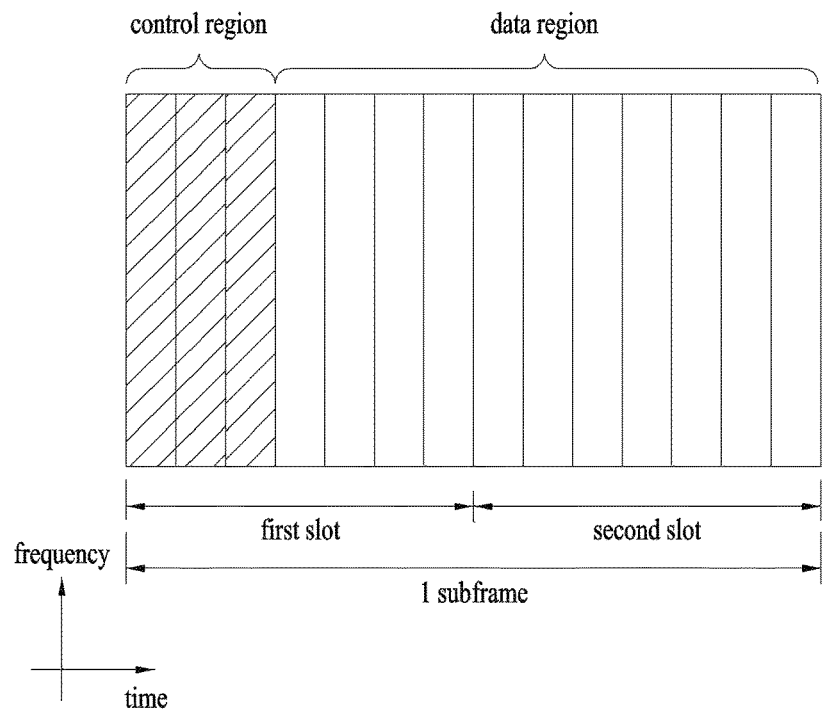
FIG. 3 is a diagram for structure of a downlink subframe.

FIG. 3 is a diagram illustrating a structure of a downlink subframe. Referring to FIG. 3, maximum three OFDM symbols located at the front of the first slot of a subframe correspond to a control region to which a control channel is allocated. The other OFDM symbols correspond to a data region to which a physical downlink shared channel (PDSCH) is allocated. A basic unit of transmission becomes one subframe. In particular, PDCCH and PDSCH are assigned over two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK signals in response to uplink transmission. The control information transmitted through the PDCCH will be referred to as downlink control information (DCI). The DCI includes uplink or downlink scheduling information, uplink transmission (Tx) power control command for a random UE group and the like. The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on a correlation between the number of CCEs and a coding rate provided by the CCE. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 4:
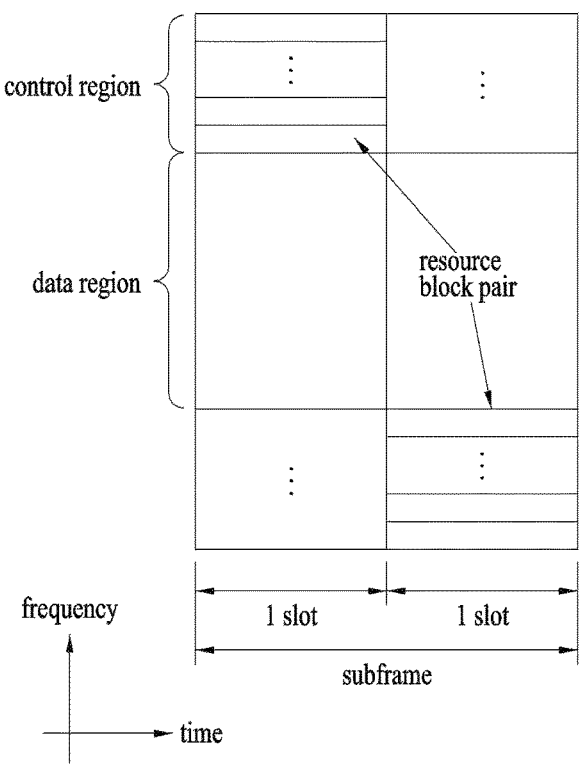
FIG. 4 is a diagram for structure of an uplink subframe.

FIG. 4 is a diagram for structure of an uplink subframe. Referring to FIG. 4, a UL subframe may be divided into a control region and a data region in a frequency domain. A physical uplink control channel (PUCCH) including uplink control information is allocated to the control region and a physical uplink shared channel (PUSCH) including user data is allocated to the data region. In order to maintain single carrier property, a UE does not transmit the PUCCH and the PUSCH at the same time. The PUCCH for one UE is allocated to a resource block pair in a subframe. The resource blocks belonging to the resource block pair occupy a different subcarrier with respect to two slots. This is represented as the resource block pair allocated to the PUCCH is frequency-hopped at a slot boundary.

MIMO System Modeling

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 5 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 5. Regarding a transmission signal, up to $N_T$ pieces of information can be transmitted through the $N_T$ Tx antennas, as expressed as the following vector.

$$s = [s_1, s_2, \Lambda, s_{N_T}]^T$$

Individual pieces of the transmission information $s_1$, $s_2$, ..., $s_{N_T}$ may have different transmit powers. If the individual transmit powers are denoted by $P_1, P_2, \ldots P_{N_T}$, respectively, then the transmission power-controlled transmission information may be given as $$\hat{s} = [\hat{s}_1, \hat{s}_2, \Lambda, \hat{s}_{N_T}]^T = [P_1 s_1, P_2 s_2, \Lambda, P_{N_T} s_{N_T}]^T$$

The transmission power-controlled transmission information vector $\hat{S}$ may be expressed below, using a diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & M & O & M \\ w_{i1} & w_{i2} & \Lambda & w_{iN_T} \\ M & M & O & M \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \le \text{rank}(H) \le \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

CSI Feedback

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by M matrix.} \quad \text{[Equation 9]}$$

$$W2(j) = \begin{bmatrix} e_M^k & e_M^l & e_M^m \\ \alpha_j e_M^k & \beta_j e_M^l & \cdots & \gamma_j e_M^m \end{bmatrix} (\text{if rank} = r),$$

$$\text{where } 1 \le k, l, m \le M \text{ and } k, l, m \text{ are integer}$$

where Nt is the number of Tx antennas, M is the number of columns of a matrix $X_i$, indicating that the matrix $X_i$ includes a total of M candidate column vectors. $e_M^k$, $e_M^l$, and $e_M^m$ denote k-th, l-th, and m-th column vectors of the matrix $X_i$ in which only k-th, l-th, and m-th elements among M elements are 0 and the other elements are 0, respectively. $\alpha_j$, $\beta_j$, and $\gamma_j$ are complex values each having a unit norm and indicate that, when the k-th, l-th, and m-th column vectors of the matrix $X_i$ are selected, phase rotation is applied to the column vectors. At this time, i is an integer greater than 0, denoting a PMI index indicating W1 and j is an integer greater than 0, denoting a PMI index indicating W2.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where $N_T$ is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

As mentioned in the foregoing description, channel state information (CSI) includes CQI, PMI, RI, and the like in LTE system. All or a part of the CQI, the PMI, and the RI is transmitted depending on a transmission mode of a UE. When the CSI is periodically transmitted, it is referred to as periodic reporting. When the CSI is transmitted upon the request of a base station, it is referred to as aperiodic reporting. In case of the aperiodic reporting, a request bit, which is included in uplink scheduling information transmitted by a base station, is transmitted to a UE. The UE forwards CSI to the base station via a data channel (PUSCH) in consideration of a transmission mode of the UE. In case of the periodic reporting, a period and an offset in the period are signaled in a unit of a subframe according to a UE using a semi-static scheme via higher layer signaling. A UE forwards CSI to a base station via an uplink control channel (PUCCH) according to a determined period in consideration of a transmission mode. If uplink data exists at the same time in a subframe in which CSI is transmitted, the CSI is transmitted via an uplink data channel (PUSCH) together with the data. The base station transmits transmission timing information appropriate for a UE to the UE in consideration of a channel status of each UE, a UE distribution status in a cell, and the like. The transmission timing information includes a period for transmitting CSI, offset, and the like and can be transmitted to each UE via an RRC message.

LTE system includes 4 types of CQI reporting mode. Specifically, the CQI reporting mode is divided into WB CQI and SB CQI according to a CQI feedback type and is divided into no PMI and single PMI depending on whether PMI is transmitted or not. In order to periodically report CQI, each UE receives information consisting of a combination of a period and an offset via RRC signaling.

CSI reporting types defined in LTE release-10 are described in the following.

A type 1 report supports CQI feedback for a UE on a selected subband. A type 1a report supports subband CQI and second PMI feedback. A type 2, a type 2b, and a type 2c reports support wideband CQI and PMI feedback. A type 2a report supports wideband PMI feedback. A type 3 report supports RI feedback. A type 4 report supports wideband CQI. A type 5 report supports RI and wideband PMI feedback. A type 6 report supports RI and PTI (precoding type indicator) feedback.

Massive MIMO

A recent wireless communication system considers introducing an active antenna system (hereinafter, AAS). Unlike a legacy passive antenna system that an amplifier capable of adjusting a phase and a size of a signal is separated from an antenna, the AAS corresponds to a system that each antenna is configured as an active antenna including such an active circuit as an amplifier. Since the AAS uses an active antenna, it is not necessary for the AAS to have a separate cable for connecting an amplifier with an antenna, a connector, other hardware, and the like. Hence, the AAS has characteristics that efficiency is high in terms of energy and management cost. In particular, since the AAS supports an electronic beam control scheme according to each antenna, the AAS enables an evolved MIMO technique such as forming a delicate beam pattern in consideration of a beam direction and a beam width, forming a 3D beam pattern, and the like.

As the evolved antenna system such as the AAS and the like is introduced, a massive MIMO structure including a plurality of input/output antennas and multi-dimensional antenna structure are also considered. As an example, in case of forming a 2D antenna array instead of a legacy straight antenna array, it may be able to form a 3D beam pattern by the active antenna of the AAS.

Figure 6:
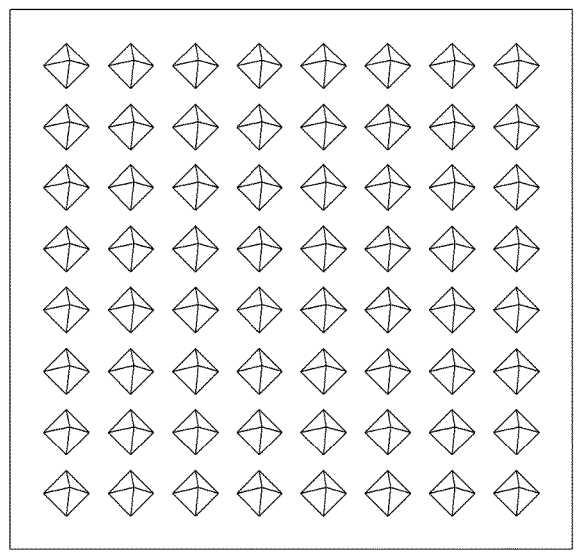
FIG. 6 illustrates a 2D active antenna system having 64 antenna elements.

FIG. 6 illustrates a 2D active antenna system having 64 antenna elements.

Referring to FIG. 6, it is able to see that $N_t = N_v \cdot N_h$ number of antennas forms a shape of square. In particular, $N_h$ and $N_v$ indicate the number of antenna columns in horizontal direction and the number of antenna rows in vertical direction, respectively.

If the 3D beam pattern is utilized in the aspect of a transmission antenna, it may be able to perform semi-static or dynamic beam forming not only in horizontal direction but also in vertical direction of a beam. As an example, it may consider such an application as sector forming in vertical direction and the like. In the aspect of a reception antenna, when a reception beam is formed using massive antennas, it may be able to expect a signal power increasing effect according to an antenna array gain. Hence, in case of uplink, an eNB is able to receive a signal transmitted from a UE through a plurality of antennas. In this case, in order to reduce interference impact, the UE can configure transmit power of the UE to be very low in consideration of a gain of massive reception antennas.

Figure 7:
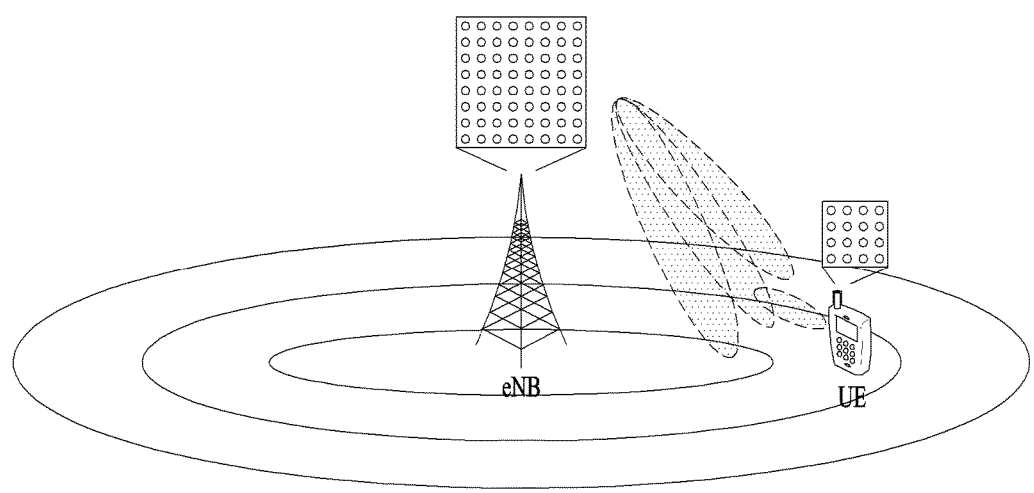
FIG. 7 illustrates a 3D-MIMO system utilizing 2D-AAS.

FIG. 7 illustrates a 3D-MIMO system utilizing 2D-AAS. In particular, FIG. 7 shows a system that an eNB or a UE has a plurality of transmission/reception antennas capable of forming an AAS-based 3D beam.

Meanwhile, an antenna port corresponds to a concept of a logical antenna and does not mean an actual antenna element. Hence, the antenna port and the antenna element itself can be referred to as a virtual antenna and a physical antenna, respectively. A scheme of mapping an antenna port to a physical antenna element is an important element in designing the overall MIMO system. One-to-one mapping for mapping an antenna port to an antenna element and one-to-many mapping for mapping an antenna port to a plurality of antenna elements can be considered as the antenna mapping scheme.

Mapping an antenna port to an antenna element is represented as a virtualization matrix B in equation 11. In this case, x corresponds to a signal transmitted from the antenna port and z corresponds to a signal transmitted from the antenna element. The number of antenna ports can be smaller than the number of antenna elements. Yet, for clarity, assume that the number of antenna ports also corresponds to $N_t$. $b_n$ corresponds to a virtualization vector indicating a relation that an $n^{th}$ antenna port is mapped to antenna elements. If the number of non-zero element of the virtualization vector $b_n$ corresponds to 1, it indicates the one-to-one mapping scheme. If the number of non-zero element of the virtualization vector $b_n$ corresponds to a plural number, it indicates the one-to-many mapping scheme.

$$z = Bx = [b_0 b_1 \Lambda b_{N_t-1}]x. \quad \text{[Equation 11]}$$

In equation 11, in order to consider that signal energy of an antenna port and signal energy of an antenna element are the same, assume that a virtualization vector is normalized to $\|b_n\| = 1$. In the following, a relation between an antenna element and an antenna port is explained in more detail with reference to the drawing.

Figure 8:
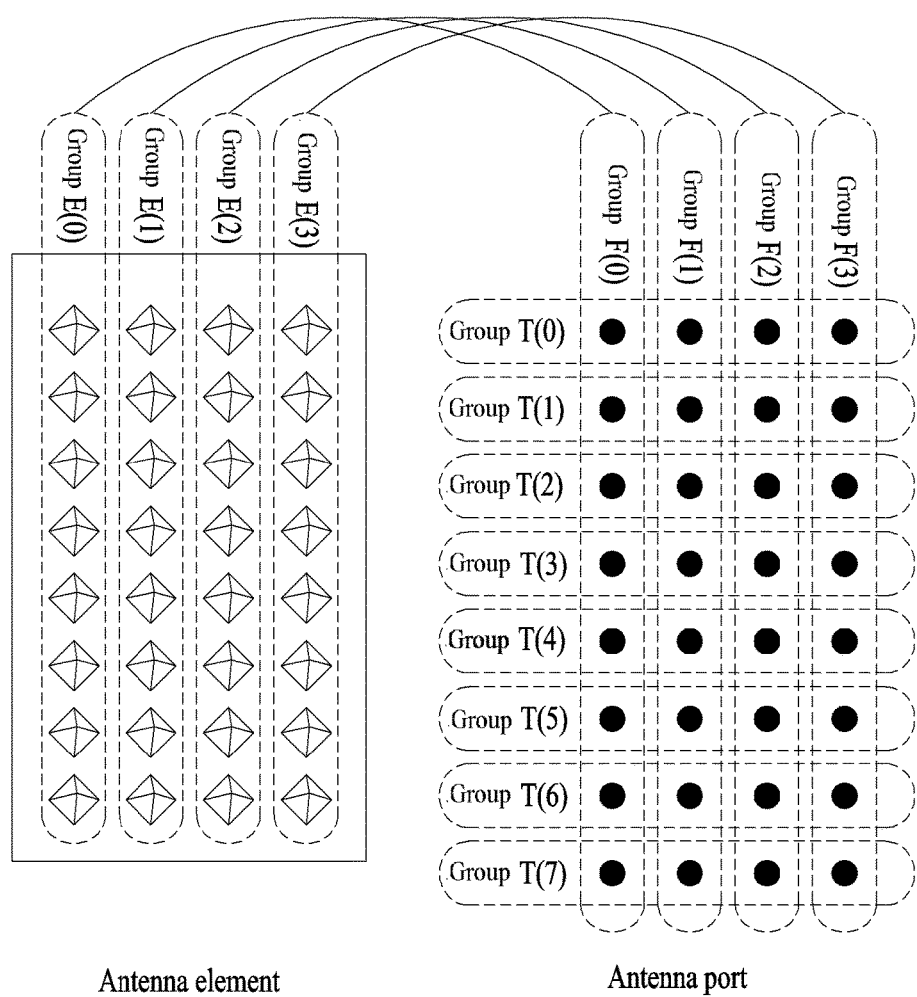
FIG. 8 is a diagram illustrating a relation between an antenna element and an antenna port in 2D AAS system to which massive MIMO is applied.

FIG. 8 illustrates a relation between an antenna element and an antenna port in a 2D AAS system to which massive MIMO is applied. In particular, the left drawing of FIG. 8 shows 32 antenna elements in total, i.e., 32 physical antennas, and the right drawing of FIG. 8 shows 32 antenna ports in total, i.e., 32 logical antennas.

In particular, FIG. 8 shows a grouping scheme of antenna elements and a grouping scheme of antenna ports. FIG. 8 also shows mapping between an antenna element and an antenna port. Referring to FIG. 8, it is able to see that antenna elements are grouped as antenna columns in vertical direction. Specifically, the antenna elements are divided into 4 groups including E(0), E(1), E(2), and E(3). And, the 32 antenna ports are also divided into 4 groups to form groups including F(0), F(1), F(2), and F(3).

In this case, antenna ports belonging to a group F(i) are virtualized using all antenna elements belonging to a group E(i). A virtualization vector of each antenna port belonging to the group F(i) is differently configured. One antenna port is selected from each antenna port group to form a group T(i). Each antenna port belonging to the group T(i) uses an identical virtualization vector to be mapped to a different antenna element group. An RS for each antenna port belonging to the group T(i) is transmitted to an identical OFDM symbol.

In a FD MIMO system, an eNB can set a plurality of CSI-RS resources to a UE in a single CSI process. In this case, the CSI process corresponds to an operation of making a feedback with an independent feedback configuration. For example, 8 CSI-RS resources can be configured within a single CSI process. In this case, 8 CSI-RSs correspond to a group T(0) to a group T(7) in FIG. 8.

Since different virtualization is applied, different beamforming is applied to each of 8 4-port CSI-RSs. For example, in case of a CSI-RS corresponding to the T(0), vertical direction beamforming is applied to the CSI-RS using a zenith angle of 100 degrees and the CS-RS is configured with a zenith angle difference of 5 degrees. Hence, vertical direction beamforming is applied to a CSI-RS corresponding to the T(7) with a zenith angle of 135 degrees.

The UE selects a CSI-RS of a strong channel from among 8 CSI-RSs, calculates CSI on the basis of the selected CSI-RS, and report the CSI to the eNB. In this case, the UE additionally reports the selected CSI-RS to the eNB through a beam index (BI) value. For example, if a channel of a first CSI-RS corresponding to T(0) is strongest, the UE sets the BI to 0 to report the channel to the eNB. In this case, since the beam index corresponds to information on the selected CSI-RS, the beam index can also be referred to as a CRI (CSI-RS resource indicator).

In the following, for clarity, assume that a BI indicates selection of a CSI-RS. More specifically, the BI may indicate a combination between a specific CSI-RS and a specific antenna port. For example, the BI selects a CSI-RS from among 8 CSI-RSs included in a CSI process and additionally selects a combination between an antenna port 15 and an antenna port 16 from the selected CSI-RS. If it is able to select one from among a combination between an antenna port 15 and an antenna port 16 and a combination between an antenna port 17 and an antenna port 18 in each CSI-RS, the BI is able to indicate one of 16 values. In particular, a BI for a combination between an antenna port 15 and an antenna port 16 of a first CSI-RS is mapped in an order of 0, a BI for a combination between an antenna port 17 and an antenna port 18 of the first CSI-RS is mapped in an order of 1, a BI for a combination between an antenna port 15 and an antenna port 16 of a second CSI-RS is mapped in an order of 2, and a BI for a combination between an antenna port 17 and an antenna port 18 of the second CSI-RS is mapped in an order of 3. In particular, a BI for a combination between an antenna port 17 and an antenna port 18 of an eighth CSI-RS is lastly mapped in an order of 15. In particular, when a BI indicates a combination between antenna ports, the proposed scheme of the present invention can be applied as it is.

Meanwhile, since feedback overhead may additionally occur to a UE due to BI report, it is necessary to have a BI compression scheme to reduce the feedback overhead. In particular, when PDSCH is transmitted on the entire system bandwidth, an optimized BI may differ from an optimized BI when PDSCH is transmitted on a specific SB. Hence, it is necessary to separately define a WB BI and an SB BI. However, if a BI is reported according to each SB, PUSCH overhead may increase. Hence, in order to set a limit on the overhead increase, following proposals are proposed.

Proposal 1: While a WB BI and an SB BI are reported together, it may be able to configure the SB BI to select an adjacent beam only of the WB BI on the basis of the WB BI.

Proposal 2: While a WB BI and an SB BI are reported together, it may be able to configure the SB BI to select an adjacent beam only on the basis of a previous SB BI value.

Proposal 3: While a WB BI and an SB BI are reported together, a BI is reported in a unit of N number of SBs instead of a unit of an SB.

Figure 9:
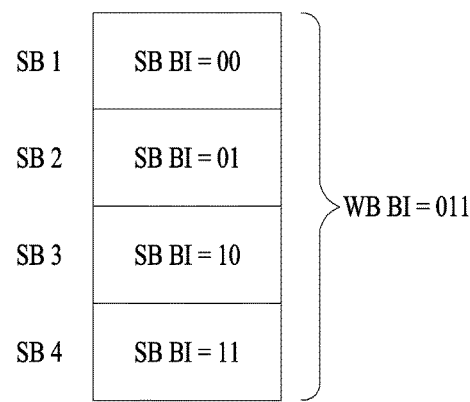
FIG. 9 illustrates an example of reporting a beam index according to an embodiment of the present invention.

FIG. 9 illustrates an example of reporting a beam index according to an embodiment of the present invention. In particular, in FIG. 9, assume that the proposal 1 is applied.

Referring to FIG. 9, a UE selects a fourth CSI-RS of a CSI process by assuming a case of scheduling WB PDSCH and reports 3 (i.e., 011) as a WB BI. And, the UE selects and reports a value adjacent to 3 corresponding to the WB BI as an SB BI corresponding to each SB. For example, when 4 SBs exist and a size of an SB BI corresponds to 2 bits, each bit state can be defined as table 1 described in the following.

TABLE 1

| SB BI | Bit state |
|-------|-----------|
| 00 | same as WB BI |
| 01 | WB BI + 1 |
| 10 | WB BI + 2 |
| 11 | WB BI − 1 |

In this case, as shown in FIG. 9, if 00, 01, 10, and 11 are reported according to each SB, a BI of SB 1 reports 3, a BI of SB 2 reports 4, a BI of SB 3 reports 5, and a BI of SB 4 reports 2, respectively.

As an example of the aforementioned proposal 2, a UE selects a fourth CSI-RS of a CSI process by assuming a case of scheduling WB PDSCH and reports 3 (i.e., 011) as a WB BI. And, the UE selects a CSI-RS from among 8 CSI-RSs for an SB BI corresponding to an SB 1 (first SB) and reports it with a size of 3 bits. For example, the UE reports 2 (i.e., 010) as an SB BI. The UE reports the remaining SB BI value with a size of 2 bits by selecting a value from among values adjacent to 2 corresponding to a BI of a previous SB (i.e., SB 1).

More specifically, when 4 SBs exist, each bit state can be defined as table 2 described in the following.

TABLE 2

| SB BI | Bit state |
|-------|-----------|
| 00 | same as previous SB BI |
| 01 | previous SB BI + 1 |
| 10 | previous SB BI + 2 |
| 11 | previous SB BI − 1 |

In this case, for example, if bit state values of SB 2 to SB 4 correspond to 00, 01, and 10, respectively, since the BI of the SB 1 is already reported by 2, a BI of the SB 2 reports 2, a BI of the SB 3 reports 3, and a BI of the SB 4 reports 5, respectively.

In general, since a channel changes with a correlation on the basis of a frequency axis, a correlation exists between SB BI values. Hence, although an SB BI is not selected from among 8 values and a nearby BI value is selected on the basis of a WB BI or a BI of an adjacent SB, it is able to select an optimized SB BI without any problem. Consequently, it may be able to minimize additional overhead for reporting a BI.

Meanwhile, an example for the aforementioned proposal 3 is explained in the following. According to current LTE standard document, an SB unit is defined by a function having a system bandwidth as a factor. Hence, a UE does not feedback a BI in the SB unit. Instead, the UE feedbacks a representative value in a unit of N number of adjacent SBs. For example, if N corresponds to 2 and 9 SBs are defined, total 5 BIs corresponding to (SB 1, SB 2), (SB 3, SB 4), (SB 5, SB 6), (SB 7, SB 8), and (SB 9) are fed back in a manner of biding SBs from a low index SB. In this case, an eNB can separately provide the N to a UE via higher later signaling such as RRC signaling.

Although the proposals 1 to 3 illustrate a BI, it is apparent that the proposals can also be extensively applied to a different CSI such as CQI, PMI, and RI. And, when a BI is periodically reported via PUCCH, the abovementioned compression scheme can also be applied. In addition, in case of a periodic report, a BI compression scheme described in the following is proposed. In particular, in the proposal 1, the proposal 2, and the proposal 3, although BIs are applied in a manner of being divided into a WB BI and an SB BI on the basis of a frequency axis, the same scheme can be applied by dividing BIs on the basis of a time axis. In particular, BIs can be divided into a long-term BI and a short-term BI according to a transmission interval. In the proposal 1, the proposal 2, and the proposal 3, the WB BI and the SB BI can be applied in a manner of being replaced with the long-term BI and the short-term BI, respectively.

Since the BIs are divided into a long-term BI and a short-term BI according to a transmission interval, the short-term BI is configured to select an adjacent beam only on the basis of the long-term BI. For example, a UE selects a fourth CSI-RS from among 8 CSI-RSs set to a CSI process and reports 3 as a long-term BI. Subsequently, the UE selects a value from among values near 3 corresponding to the recently reported long-term BI as a short-term BI and reports the selected value. For example, when a size of the short-term BI corresponds to 2 bits, each bit state can be defined as Table 3 described in the following.

TABLE 3

| SB BI | Bit state |
|---|---|
| 00 | same as long-term BI |
| 01 | long-term BI + 1 |
| 10 | long-term BI + 2 |
| 11 | long-term BI − 1 |

In this case, it may be able to report that the short-term BI is identical to the recently reported long-term BI by reporting a short-term BI value 00.

As a basic operation, a long-term/WB BI and a short-term SB/BI are calculated on the basis of a CSI-RS and are 1:1 mapped to an index of a selected CSI-RS. In this case, the long-term/WB BI and the short-term SB/BI can also be calculated on the basis of an RS of a different type to which beamforming is applied (hereinafter, a BRS). Moreover, although the long-term/WB BI and the short-term SB/BI are calculated on the basis of RSs different from each other in type, the present invention can also be applied. For example, if the long-term/WB BI is calculated on the basis of a BRS, the long-term/WB BI may play a role in selecting a BRS from among a plurality of BRSs. The short-term SB/BI can be calculated on the basis of a CSI-RS. In this case, a BRS is connected with a plurality of CSI-RSs and it is preferable for an eNB to inform a UE of a connection relation between the BRS and a plurality of the CSI-RSs via a separate control signal. If a UE selects a BRS as a long-term/WB BI, the UE calculates and reports a short-term/SB BI to a CSI-RS connected with the selected BRS.

Figure 10:
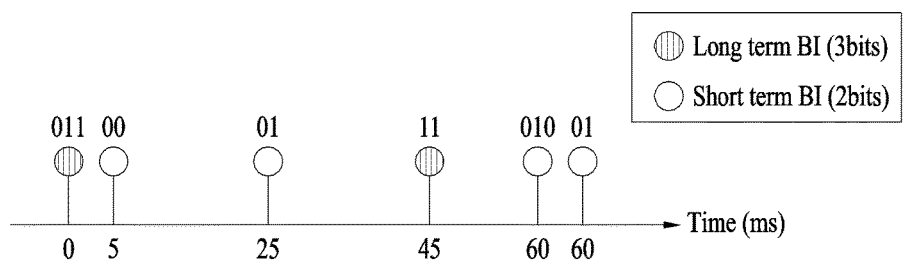
FIG. 10 illustrates an example of reporting a long-term BI and a short-term BI according to an embodiment of the present invention.

FIG. 10 illustrates an example of reporting a long-term BI and a short-term BI according to an embodiment of the present invention. In FIG. 10, assume that a transmission interval of 20 ms and an offset of 5 ms are set to the shot-term BI and a transmission interval of 60 ms, which is longer than the transmission interval of the short-term BI as much as 3 times, and an offset of 0 ms are set to the long-term BI.

Referring to FIG. 10, when 8 CSI-RSs are configured in a CSI process, since a long-term BI can select one from among all CSI-RS resources set to the CSI process, the long-term BI is transmitted with a size of 3 bits. In particular, referring to FIG. 10, the long-term BI is reported by selecting a fourth CSI-RS and a third CSI-RS from a subframe #0 and a subframe #60, respectively. In a subframe #5, a subframe #25, and a subframe #45, a short-term BI is reported on the basis of the long-term BI reported in the subframe #0. In particular, a fourth CSI-RS, a fifth CSI-RS, and a fourth CSI-RS are selected and reported in the subframe #5, the subframe #25, and the subframe #45, respectively. Since an index is increased as much as 1 in a subframe #65 on the basis of the long-term BI reported in the subframe #60, a fourth CSI-RS is selected and reported in the subframe #65.

In FIG. 10, a short-term BI can be transmitted together with a different CSI value. For example, the short-term BI can be transmitted together with an RI value. In this case, if the RI is reported together with a long-term BI of a size of 3 bits, a coding gain becomes weaker and reliability can be degraded. Hence, it is preferable to transmit the RI together with a short-term BI of a size of 2 bits. In this case, an interval of a long-term BI capable of being configured by an eNB can be restricted to a multiple of an RI interval. It may be able to reduce a collision by differentiating CSI from an offset of a long-term BI.

Or, in FIG. 10, a long-term BI can be transmitted together with a specific CSI value and a short-term BI can be transmitted together with a different specific CSI value. For example, a long-term BI can be transmitted together with an RI value and a short-term BI can be transmitted together with PMI or CQI.

In the foregoing description, the SB/short-term BI is configured to select an adjacent beam only on the basis of a WB/long-term BI value. Besides, as a further different compression scheme, a WB/long-term BI informs an SB/short-term BI of a set of a plurality of BIs and the SB/short-term BI can select a BI from the set.

For example, when 8 BI values (0, 1, 2, . . . , 7) exist in a process, a WB/long-term BI selects a set from among sets {0,1,2,3}, {2,3,4,5}, {4,5,6,7,}, {6,7,0,1} and informs an SB/short-term BI of the selected set. If the set selected by the WB/long-term BI corresponds to {0,1,2,3}, the SB/short-term BI selects one from among 0, 1, 2, and 3 or selects a plurality of BI values.

In this case, an eNB can provide the BI set indicated by the WB/long-term BI to a UE via RRC layer signaling. In particular, the eNB respectively defines the WB/long-term BI as {0,1,2,3}, {2,3,4,5}, {4,5,6,7,}, {6,7,0,1} and informs the UE of the BI sets via RRC layer signaling.

Or, the eNB defines a plurality of sets in advance and may inform the UE of a set to be used for defining the WB/long-term BI. For example, the eNB can inform the UE of alternative to be used by the eNB among alternative 1 configured by {0,1,2,3}, {2,3,4,5}, {4,5,6,7,}, {6,7,0,1} and alternative 2 configured by {0,2,4,6}, {1,3,5,7}, {0,1,4,5}, {2,3,6,7}. Since correlation is high between beams corresponding to BIs adjacent to each other, the alternative 1 is defined as a set of beams where correlation is high by configuring indexes adjacent each other as a single set. On the contrary, the alternative 2 is defined as a set of beams where correlation is relatively low. In order to make a UE select a distributed antenna group, which is geographically apart, via an SB/short-term BI in DAS (distributed antenna system) environment, the alternative 2 is more preferable.

In addition, it may also consider a scheme that a UE selects and reports the N number of WB/long-term BIs and the UE reports one or a plurality of the BIs among the N number of BIs as an SB/short-term BI. Of course, an eNB can inform the UE of the N via RRC layer signaling. In this case, the UE can freely select BIs ranging from a most preferred BI to an $N^{th}$ preferred BI. The UE selects one or a plurality of BIs from among the BIs ranging from the most preferred BI to the $N^{th}$ preferred BI and reports the selected BI(s) via an SB/short-term BI.

Figure 11:
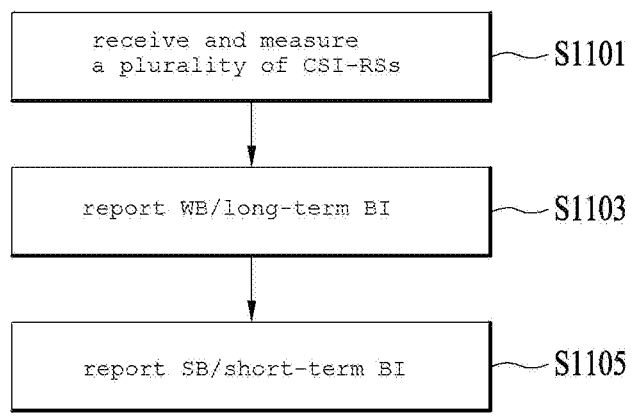
FIG. 11 is a flowchart illustrating a method of reporting a beam index according to an embodiment of the present invention.

FIG. 11 is a flowchart illustrating a method of reporting a beam index according to an embodiment of the present invention. In particular, assume that FIG. 11 illustrates a method of reporting a beam index according to the aforementioned proposal 1 and the table 1.

Referring to FIG. 11, a UE receives a plurality of reference signals from an eNB in the step S1101. In this case, a plurality of the reference signals can be defined by a plurality of CSI-RS resources set to a single CSI process. Having received the reference signals, the UE measures a plurality of beams using a plurality of the reference signals. In this case, each of a plurality of the reference signals can be mapped to each of a plurality of the beams by 1 to 1. Yet, as mentioned in the foregoing description, many to one relation is also available between a plurality of the reference signals and a plurality of the beams.

Subsequently, the UE reports an index of a most preferred beam among a plurality of the beams to the eNB in the step S1103 and reports information on at least one second preferred beam, which is determined on the basis of the most preferred beam, to the eNB in the step S1105. In this case, preferably, the most preferred beam corresponds to a beam for performing wideband DL transmission and the at least one second preferred beam corresponds to a beam for performing subband DL transmission. Or, a reporting interval of the most preferred beam can be configured by a multiple of a reporting interval of the at least one second preferred beam. In particular, the most preferred beam corresponds to a long-term beam and the second preferred beam corresponds to a short-term beam.

Preferably, although the information on the at least one second preferred beam corresponds to information on an index difference between the most preferred beam and the least one second preferred beam, the information can include information on whether or not the at least one second preferred beam is identical to the most preferred beam as well. Of course, as shown in table 1, it is preferable to configure a difference between an index of the at least one second preferred beam and an index of the most preferred beam to be equal to or less than 2. By doing so, the second preferred beam can be selected in a manner of being adjacent to the most preferred beam.

Additionally, an eNB can provide configuration information of a plurality of the reference signals to a UE via higher layer signaling. In this case, an index of the most preferred beam may correspond to an index of a reference signal corresponding to the most preferred beam. Of course, an index of the second preferred beam also corresponds to an index of a reference signal.

Figure 12:
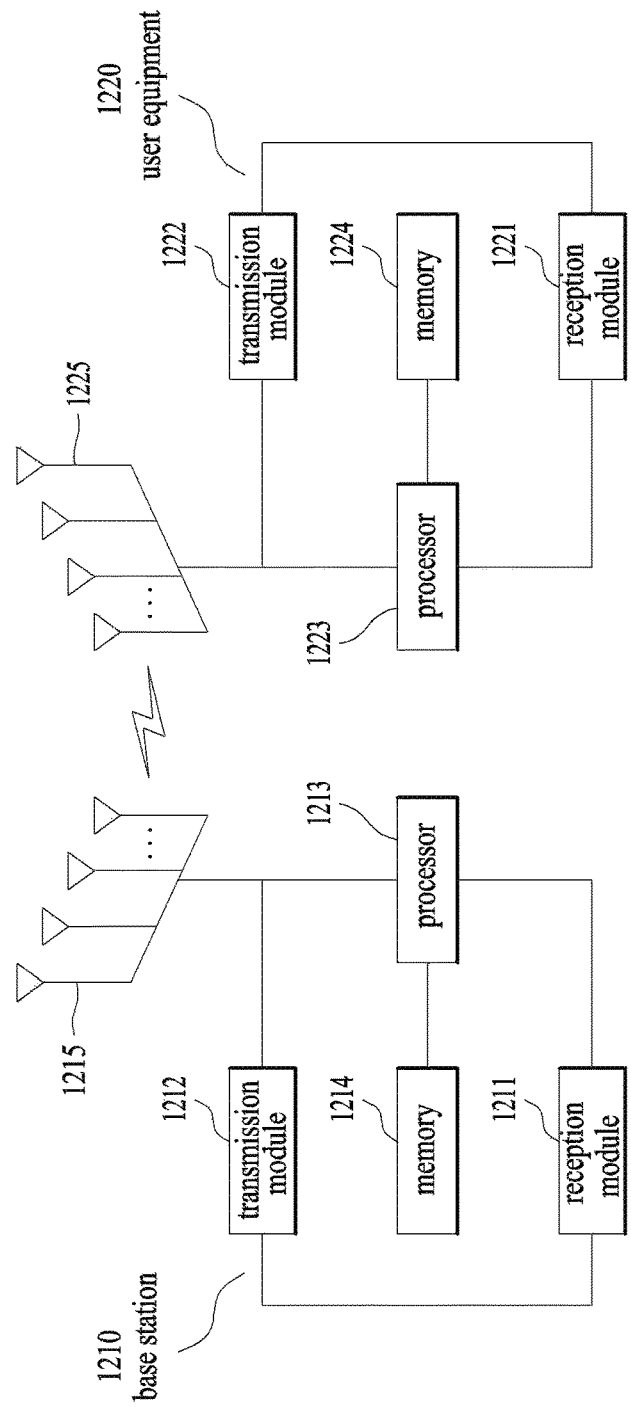
FIG. 12 is a diagram for a configuration of a base station and a user equipment applicable to one embodiment of the present invention.

FIG. 12 is a diagram for a base station and a user equipment capable of being applied to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 12, a wireless communication system includes a base station (BS) 1210 and a user equipment (UE) 1220. The BS 1210 includes a processor 1213, a memory 1214 and a radio frequency (RF) units 1211/1212. The processor 1213 can be configured to implement the proposed functions, processes and/or methods. The memory 1214 is connected with the processor 1213 and then stores various kinds of information associated with an operation of the processor 1213. The RF units 1211/1212 are connected with the processor 1213 and transmits and/or receives a radio signal. The user equipment 1220 includes a processor 1223, a memory 1224 and a radio frequency (RF) unit 1221/1222. The processor 1223 can be configured to implement the proposed functions, processes and/or methods. The memory 1224 is connected with the processor 1223 and then stores various kinds of information associated with an operation of the processor 1223. The RF unit 1221/1222 is connected with the processor 1223 and transmits and/or receives a radio signal. The base station 1210 and/or the user equipment 1220 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used for a wireless communication device such as a terminal, a relay, a base station and the like.

What is claimed is:

1. A method of reporting a beam index by a user equipment (UE) to an enhanced Node B (eNB) in a wireless access system, the method comprising:
receiving a plurality of reference signals from the eNB;
measuring a plurality of beams using the plurality of the reference signals;
reporting an index of a most preferred beam among the plurality of the beams to the eNB; and
reporting information on at least one second preferred beam, which is determined on the basis of the most preferred beam, to the eNB,
wherein the information on the at least one second preferred beam corresponds to information on an index difference between the most preferred beam and the at least one second preferred beam.

2. The method of claim 1, wherein the most preferred beam corresponds to a beam for performing wideband downlink (DL) transmission and wherein the at least one second preferred beam corresponds to a beam for performing subband DL transmission.

3. The method of claim 1, wherein a reporting interval of the most preferred beam is configured by a multiple of a reporting interval of the at least one second preferred beam.

4. The method of claim 1, wherein the information on the at least one second preferred beam comprises information on whether or not the at least one second preferred beam is identical to the most preferred beam.

5. The method of claim 1, further comprising:
receiving configuration information of the plurality of the reference signals from the eNB,
wherein the index of the most preferred beam corresponds to an index of a reference signal corresponding to the most preferred beam.

6. The method of claim 1, wherein a difference between an index of the at least one second preferred beam and the index of the most preferred beam is equal to or less than 2.

7. A method of receiving a beam index by an enhanced Node B (eNB) from a user equipment (UE) in a wireless access system, the method comprising:
transmitting a plurality of reference signals to the UE;
receiving an index of a most preferred beam among a plurality of beams, which are measured using the plurality of the reference signals, from the UE; and
receiving information on at least one second preferred beam, which is determined on the basis of the most preferred beam, from the UE,
wherein the information on the at least one second preferred beam corresponds to information on an index difference between the most preferred beam and the at least one second preferred beam.

8. The method of claim 7, wherein the most preferred beam corresponds to a beam for performing wideband downlink (DL) transmission and wherein the at least one second preferred beam corresponds to a beam for performing subband DL transmission.

9. The method of claim 7, wherein a reporting interval of the most preferred beam is configured by a multiple of a reporting interval of the at least one second preferred beam.

10. The method of claim 7, wherein the information on the at least one second preferred beam comprises information on whether or not the at least one second preferred beam is identical to the most preferred beam.

11. The method of claim 7, further comprising:
transmitting configuration information of the plurality of the reference signals to the UE,
wherein the index of the most preferred beam corresponds to an index of a reference signal corresponding to the most preferred beam.

12. The method of claim 7, wherein a difference between an index of the at least one second preferred beam and the index of the most preferred beam is equal to or less than 2.

* * * * *